(12) United States Patent
Asfandiyarov (10) Patent No.: US 11,326,945 B2
(45) Date of Patent: May 10, 2022

(54) OPTICAL SYSTEM FOR THE SPECTRAL COMPONENT ANALYSIS OF NON-SOLID MEDIA

(71) Applicant: Spiden AG, Pfäffikon (CH)

(72) Inventor: Ruslan Asfandiyarov, Zurich (CH)

(73) Assignee: SPIDEN AG, Pfäffikon (CH)

( * ) Notice: Subject to any disclaimer, the term of this patent is extended or adjusted under 35 U.S.C. 154(b) by 0 days.

(21) Appl. No.: 17/250,282

(22) PCT Filed: Jul. 1, 2019

(86) PCT No.: PCT/EP2019/067530
§ 371 (c)(1),
(2) Date: Dec. 28, 2020

(87) PCT Pub. No.: WO2020/002698
PCT Pub. Date: Jan. 2, 2020

(65) Prior Publication Data
US 2021/0207996 A1    Jul. 8, 2021

(30) Foreign Application Priority Data

Jun. 29, 2018  (EP) ..................................... 18180681

(51) Int. Cl.
| | |
|---|---|
| *G01J 3/44* | (2006.01) |
| *G01J 3/02* | (2006.01) |
| *G01J 3/10* | (2006.01) |
| *G01J 3/28* | (2006.01) |
| *G01J 3/42* | (2006.01) |
| *G01N 21/31* | (2006.01) |
| *G01N 21/64* | (2006.01) |
| *G01N 21/65* | (2006.01) |

(52) U.S. Cl.
CPC ............... *G01J 3/0291* (2013.01); *G01J 3/10* (2013.01); *G01J 3/2803* (2013.01); *G01J 3/42* (2013.01); *G01J 3/44* (2013.01); *G01N 21/31* (2013.01); *G01N 21/64* (2013.01); *G01N 21/65* (2013.01); *G01N 2021/6421* (2013.01); *G01N 2201/061* (2013.01); *G01N 2201/063* (2013.01)

(58) Field of Classification Search
CPC .......... G01J 3/0291; G01J 3/10; G01J 3/2803; G01J 3/42; G01J 3/44; G01N 21/31; G01N 21/64; G01N 21/65; G01N 2021/6421; G01N 2201/061; G01N 2201/063
See application file for complete search history.

(56) References Cited

U.S. PATENT DOCUMENTS

| | | |
|---|---|---|
| 6,122,042 A | 9/2000 | Wunderman et al. |
| 6,122,536 A | 9/2000 | Sun et al. |

(Continued)

*Primary Examiner* — Abdullahi Nur
(74) *Attorney, Agent, or Firm* — Boisbrun Hofman, PLLC (57) ABSTRACT

An optical system (10) for a spectral component analysis of non-solid media, the system comprising: one or several light emitter assemblies (3), each comprising several light emitter modules (1) arranged in a curve along a ring-shaped circumference (3a) of the light emitter assembly (3); and one or several light detector assemblies (4), each comprising several light detector modules (2) arranged in a curve along a ring-shaped circumference (4a) of the light detector assembly (4), The light emitter assemblies (3) and the light detector assemblies (4) are coaxially arranged following one another along a common center axis (C) in an alternating manner.

20 Claims, 6 Drawing Sheets

(56) References Cited

U.S. PATENT DOCUMENTS

6,803,594 B2 * 10/2004 Spolaczyk .......... G01N 21/8507
                                                         250/574
7,046,347 B1    5/2006 Amend et al.

* cited by examiner

Fig. 2b

OPTICAL SYSTEM FOR THE SPECTRAL COMPONENT ANALYSIS OF NON-SOLID MEDIA

CROSS REFERENCES TO RELATED APPLICATIONS

This application claims the priority of European patent application 18180681.1, filed 29 Jun. 2018, the disclosure of which is incorporated herein by reference in its entirety.

TECHNICAL FIELD

The present application relates to an optical system for a spectral component analysis of non-solid media, in particular liquids and gases, and a corresponding method of data acquisition.

BACKGROUND ART

In known optical spectrometers for spectral detection or analysis of specific components in non-solid media, light emitters and light detectors are typically arranged in one and the same plane, with the sample under test placed between the light emitters and light detectors. In the case of absorption spectroscopy, light detectors are typically arranged directly opposite the light emitters, whereas for spectroscopic techniques involving scattering, fluorescence, or phosphorescence light detectors are also known to be arranged at various angles with respect to the light detectors reaching up to a right angle.

U.S. Pat. No. 6,122,042 describes an apparatus for photometric analysis and/or identification of properties of an object. It comprises a collection of light sources having distinct wavelength envelopes at that are activated in a rapid sequence of combinations. The apparatus further comprises a collection of spatially distributed light detectors. The light sources and detectors can be arranged in modules, with each module having its own light sources and detectors, and the modules may be arranged in a ring.

U.S. Pat. No. 7,046,347 describes a colorimetric instrument with circular arrangements of light sources and light detectors. The light sources operate at different wavelengths, and electrical circuitry controls the switching between them.

DISCLOSURE OF THE INVENTION

The object of the present invention is to provide an improved or alternative optical system for a spectral component analysis of non-solid media and a corresponding improved or alternative method of data acquisition, in particular, in regard to a spectral analysis of complex mixtures of many components and/or an enhanced precision of spectral component analysis of non-solid media.

This object is achieved by an optical system according to claim 1 and a method according to the second independent claim. Further developments of the invention are specified in the dependent claims.

According to a first aspect, an optical system for a spectral component analysis of non-solid media is provided, wherein the system comprises:
one or several light emitter assemblies, each comprising several light emitter modules arranged in a curve along a ring-shaped circumference of the light emitter assembly, and
one or several light detector assemblies, each comprising several light detector modules arranged in a curve along a ring-shaped circumference of the light detector assembly.

The light emitter assemblies and the light detector assemblies are coaxially arranged following one another along a common center axis in an alternating manner. By ring-shaped assemblies containing only light emitter modules or, respectively, only light detector modules, for instance, more freedom in the design regarding a number and arrangement of different light emitter modules or, respectively, light detector modules is provided. Thereby, for instance, a total bandwidth of the optical system and/or the spectral resolution and/or analysis accuracy can be increased.

According to the invention, each light detector module of at least one of the light detector assemblies is configured for an individual specific bandwidth with a predetermined center wavelength. The light emitter modules and light detector modules configured for a specific bandwidth with the same center wavelength are arranged on opposite sides of the respective neighboring light emitter assemblies and light detector assemblies with respect to the center axis.

This simplifies the recording of absorption spectra and Raman spectra.

Advantageously, the center wavelengths increase gradually and circularly along the circumference of the light emitter assemblies and/or light detector assemblies. This is particularly advantageous in Raman spectroscopy.

In particular, the light emitter assemblies and the light detector assemblies are configured such that the light emitter modules and the light detector modules are facing a sample under test that is to be placed within the ring-shaped circumference of the light emitter assemblies and the light detector assemblies. A ring-shaped arrangement of individual emitter or detector modules in the respective assembly need not be strictly circular, but may also be e.g. oval or irregularly shaped as a polygon etc. depending on the specific type of emitters and detectors used.

Specifically, the ring-shaped circumference of at least one, in particular all of the light emitter assemblies and/or of at least one, in particular all of the light detector assemblies can be substantially circular. This might, for instance, further increase the analysis precision and/or make the manufacture of the system simpler. (Herein, the expressions "substantially" and "approximately" may, in particular, be understood as including possible manufacturing and constructional tolerances of up to 10% of a concerned dimension or direction.) In a specific embodiment of the optical system, the specific bandwidths of the individual light emitter modules overlap, in particular only minimally, and/or the specific bandwidths of the individual light detector modules overlap, in particular only minimally.

Thereby, for instance, a particularly wide total bandwidth range of the optical system can be achieved for a given number of different light emitter modules or, respectively, light detector modules. The respective specific bandwidths of the light emitter modules or, respectively, light detector modules can be, for instance, defined by suitable optical filters. In such a case, the respective specific bandwidth is defined as a range of wavelengths in which a filter transmits the light.

In this embodiment, in particular, the bandwidth ranges of neighboring light emitter modules or, respectively, light detector modules collectively cover a total bandwidth range of the system without gaps and interruptions. For instance, the lowest and the highest transmittable wavelength of a given optical filter equals or only minimally overlaps with the highest and the lowest transmittable wavelength of the filters of the neighboring light emitter modules or, respectively, light detector modules of the respective ring-shaped light emitter or light detector assembly. A suitable percentage of possible minimal overlap depends, for instance, on the shape of the filter transmission profile and, thus, may significantly differ depending on a specific center wavelength of the respective light emitter or light detector module.

In this and any other specific embodiment of the system, optionally, at least one of the light emitter modules and/or light detector modules may additionally comprise an optical focusing or concentrating element on its side used for light emission or, respectively, light detection, for directing the emitted light or, respectively, light to be detected towards the sample under test or, respectively, towards the detector.

Specifically, in the above or other embodiments of the optical system, the resulting light emitter assemblies and light detector assemblies of the system can be configured to continuously cover a wide total bandwidth range of electromagnetic radiation, preferably extending from ultra-violet to infrared. Thereby, for instance, a particularly comprehensive spectral analysis of complex mixtures including many different components can be implemented in one system.

Alternatively or additionally, the resulting light emitter assemblies and light detector assemblies provided in the system can be configured to cover at least one or several different spectroscopic techniques including absorption; scattering, in particular Raman scattering; fluorescence; and/or phosphorescence. By covering several different spectroscopic techniques, for instance, a particularly comprehensive spectral analysis of complex mixtures including many different components can be implemented and/or the spectral resolution and/or accuracy of the spectral analysis can be enhanced.

Specifically,
the several light emitter modules of a respective light emitter assembly can be symmetrically arranged with respect to the center axis and/or equidistantly distributed around it and/or
the several light detector modules of a respective light detector assembly can be symmetrically arranged with respect to the center axis and/or equidistantly distributed around it.

Thereby, for instance, a higher precision of the spectral analysis can be achieved.

Specifically,
the several light emitter modules of a respective light emitter assembly can be substantially identical in size and shape and/or
the several light detector modules of a respective light detector assembly can be substantially identical in size and shape.

Thereby, for instance, the spectral analysis precision can be further increased and/or the manufacture and/or installation of the system can be made more simple.

Specifically, the several light emitter assemblies can be all substantially identical and/or the several light detector assemblies can be all substantially identical. Therein, in particular, the light emitter assemblies on the one hand and the light detector assemblies on the other hand can also be similar or substantially identical in size and shape. By these features, for instance, the spectral analysis precision can be further increased and/or the manufacture and/or installation of the system can be made more simple.

Specifically, the number of the light emitter assemblies of the system can be equal to the number of the light detector assemblies of the system. In other to words, the total number of axially alternating light emitter assemblies and light detector assemblies is then even. Thereby, for instance, the spectral analysis precision can be further increased since, for example, substantially identical measurement conditions for all light emitter assemblies and light detector assemblies can be realized.

Specifically, the axially alternating light emitter assemblies and light detector assemblies can be adjacently stacked along the center axis of the system at substantially equal distances from each other, in particular, directly adjacent to each other. Thereby, for instance, the spectral analysis precision can be further increased e.g. due to a particularly close spatial arrangement of the light emitter modules and the light detector modules of the neighbouring light emitter assemblies and light detector assemblies.

In a specific embodiment, the optical system is configured as a spectrometer for components analysis of a medium that is to be placed inside the ring-shaped circumference of the light emitter assemblies and the light detector assemblies. The system is further configured such that a non-solid medium under test, e.g. a liquid or a gas, can move or even flow inside the optical system along its center axis in an interspace provided centrally between the light emitter modules and the light detector modules of the respective light emitter assemblies and light detector assemblies.

Specifically, such a system can further include a readout chip for capturing a response of the light detector modules. The readout chip may, for instance, be attached to the light detector assemblies and/or fixed in space close to the light detector assemblies, whereby, for instance, the precision of capturing measurement data from the light detector modules and/or of a further data transmission can be raised.

The various embodiments and specific configurations of the optical system described herein can be combined with one another, where appropriate. Some examples are provided herein below.

According to a further aspect, a method of data acquisition using an optical system of the type described herein is provided, the method employing several different spectroscopic techniques including absorption, Raman scattering, fluorescence and/or phosphorescence, covered by the total bandwidth ranges of the light emitter assemblies and the light detector assemblies, respectively. By covering several different spectroscopic techniques, for instance, a particularly comprehensive spectral analysis of complex mixtures including many different components can be implemented and/or the spectral resolution and/or accuracy of the spectral analysis can be enhanced.

In particular, the light emitter modules of the respective light emitter assemblies can be flashed sequentially, whereas the light detector modules of the respective light detector assemblies can all measure continuously.

A specific embodiment of the method can, for instance, comprise the following steps:
flashing a first group including all light emitter modules of the system which have a specific bandwidth with the same or identical center wavelength for a predetermined short duration, which can reach, for instance, from hundreds of picoseconds to hundreds of nanoseconds depending on the type of spectroscopic techniques employed,
capturing a response of all the light detector modules of the system to flashing the first group of the light emitter modules at the same time of the flash, so as to provide information about absorption and scattering in the medium under test, capturing a response of all the light detector modules to fluoresce and phosphorescence emission in the medium under test that follow the flash, after the fluorescence and phosphorescence emission caused by flashing the first group of light emitter modules has stopped, repeating the previous steps for further central wavelengths of light emitter modules in a subsequent manner, until all light emitter modules of each light emitter assembly are flashed one by one, from the lowest to the highest or from the highest to the lowest center wavelength in a resulting total bandwidth range of the system, or in any other order, and the respective response of the light detector modules is captured.

Thereby, for instance, a comprehensive data acquisition including different spectroscopic techniques can be implemented in the most precise and/or efficient manner.

Specifically, the method can comprise subjecting non-solid medium samples to the data acquisition at different times and/or with different concentration of components of a respective mixture and performing a time-series and/or pattern analysis using thus acquired data.

BRIEF DESCRIPTION OF THE DRAWINGS

The above-mentioned and further features and the usefulness of the invention will be described in the following on the basis of examples of embodiments with reference to the drawings. Same or corresponding elements are denoted by the same reference numbers. In particular, the drawings are only schematic and thus need not be understood as true to scale. Therein

DETAILED DESCRIPTION OF EXEMPLARY EMBODIMENTS OF THE INVENTION

Figure 1A:
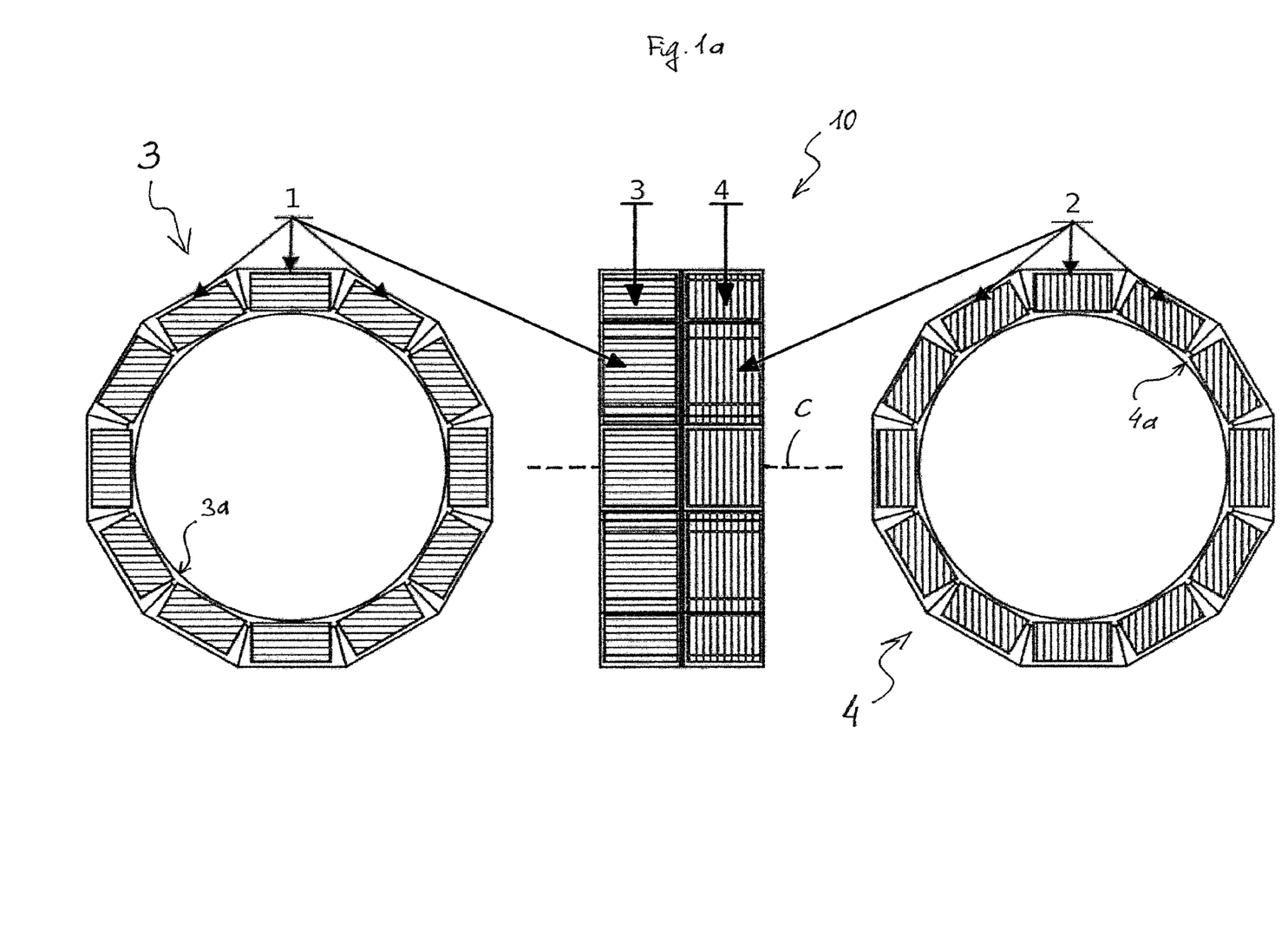
FIG. 1a shows top views of a light emitter assembly and a light detector assembly as well as their possible arrangement in an optical system according to the invention shown in a side view.

FIG. 1a schematically shows top views of a light emitter assembly 3 (on the left) and a light detector assembly 4 (on the right) of an optical system 10 according to the invention. Light emitter assembly 3 comprises several light emitter modules 1 (indicated by a horizontal hatching pattern) arranged in a curve along a ring-shaped circumference 3a of light emitter assembly 3. Light detector assembly 4 comprises several light detector modules 2 (indicated by a vertical hatching pattern) arranged in a curve along a ring-shaped circumference 4a of light detector assembly 4.

In this example, ring-shaped circumferences 3a and 4a are circular. Merely by way of example, light emitter assembly 3 contains 12 light emitter modules 1 and light detector assembly 4 contains 12 light detector modules 2. Depending on the requirements of a specific application, any other number of light emitter modules 1 or light detector modules 2 in the respective light emitter assembly 3 and light detector assembly 4 may be suitable. In particular, the respective numbers of light emitter modules 1 and light detector modules 2 in general also need not be equal in the neighboring light emitter assemblies 3 and light detector assemblies 4; they also need not necessarily be all the same for several light emitter assemblies 3 or, respectively, light detector assemblies 4, as the case may be.

In the present example, all light emitter modules 1 of the respective light emitter assembly 3 and all light detector modules 2 of the respective light detector assembly 4 are identical in size and shape. Further, they are all symmetrically arranged with respect to a center axis C of the respective ring-shaped circumference 3a and 4a and equidistantly distributed around it close to each other. As mentioned further above, these features can, for instance, raise the precision of the spectral analysis possible with the optical system 10 and/or simplify its manufacture or installation; they are, however, not necessarily required for the functionality in general.

Each light emitter module 1 of light emitter assembly 3 is configured for an individual specific bandwidth with a predetermined center wavelength, wherein the specific bandwidths of the individual light emitter modules 1 overlap only minimally and add up to a total bandwidth range of the optical system 10. Similarly, each light detector module 2 of light detector assembly 4 is configured for an individual specific bandwidth with a predetermined center wavelength, wherein the specific bandwidths of the individual light detector modules overlap only minimally and add up to a total bandwidth range of the optical system 10.

In the central part of FIG. 1a, an example of a possible arrangement of light emitter assembly 3 and light detector assembly 4 in the optical system 10 is shown in a side view. Light emitter assembly 3 and light detector assembly 4 are coaxially arranged and aligned such as to follow one another along their common center axis C. In this specific example, light emitter assembly 3 and light detector assembly 4 are directly adjacent to each other in the optical system 10 so as, for instance, to minimize light signal losses.

As can be seen in FIG. 1a, the neighboring light emitter assembly 3 and light detector assembly 4 are also aligned such that each light emitter module 1 is arranged directly opposite to a light detector module 2 of the neighboring light emitter assembly 4 with respect to the center axis C. In this example, light emitter modules 1 and light detector modules 2 configured for a specific bandwidth with the same center wavelength are arranged on opposite sides of the respective neighboring light emitter assemblies 3 and light detector assemblies 4 with respect to the center axis C.

Figure 1B:
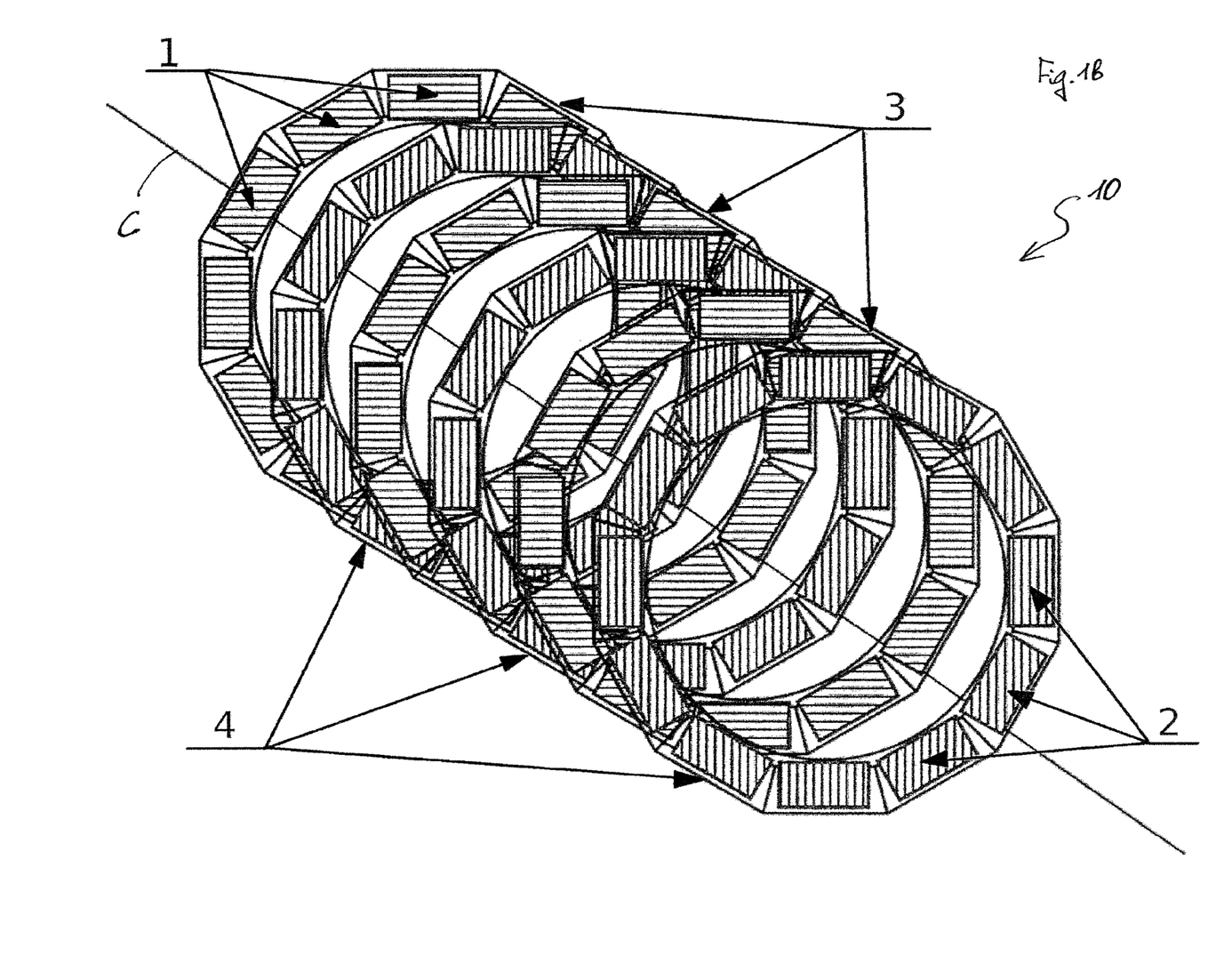
FIG. 1b shows an exploded perspective view of an example of an optical system according to the invention.

FIG. 1b shows an exploded perspective view of an optical system 10 according to the invention which, merely by way of example, comprises three light emitter assemblies 3 and three light detector assemblies 4 constructed and arranged with respect to each other as described with reference to FIG. 1a. As can be seen in FIG. 1b, light emitter assemblies 3 and light detector assemblies 4 are coaxially arranged and aligned so as to follow one another along a common center axis C in an alternating manner. In this example, the several light emitter assemblies 3 and the several light detector assemblies 4 are identical in size and shape.

Figure 1C:
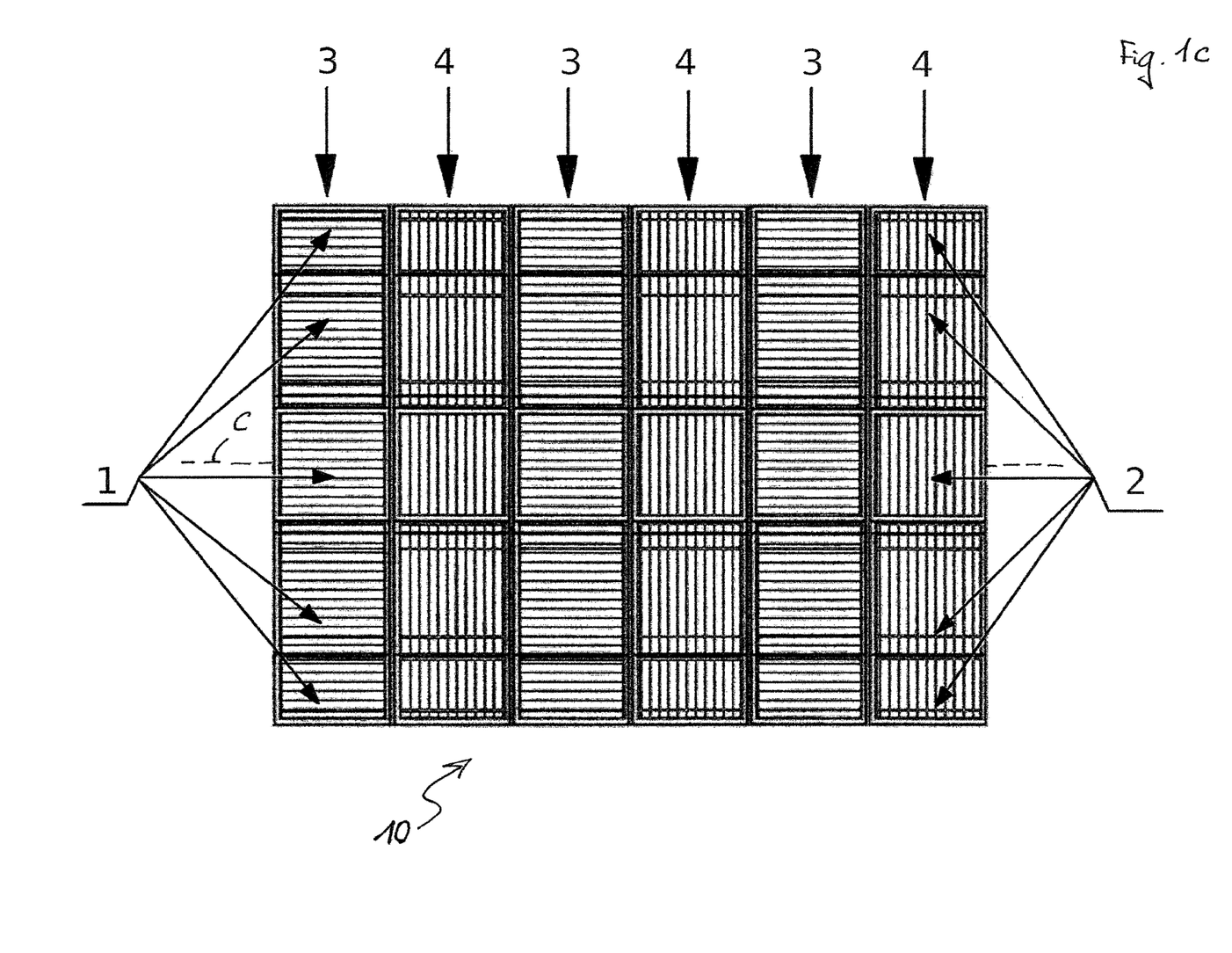
FIG. 1c shows a side view of the optical system of FIG. 1b.

FIG. 1c shows a side view of the optical system 10 of FIG. 1b. In this example, the axially alternating light emitter assemblies 3 and light detector assemblies 4 are adjacently stacked along the center axis C at equal distances from each other, namely directly adjacent to each other.

Figure 2A:
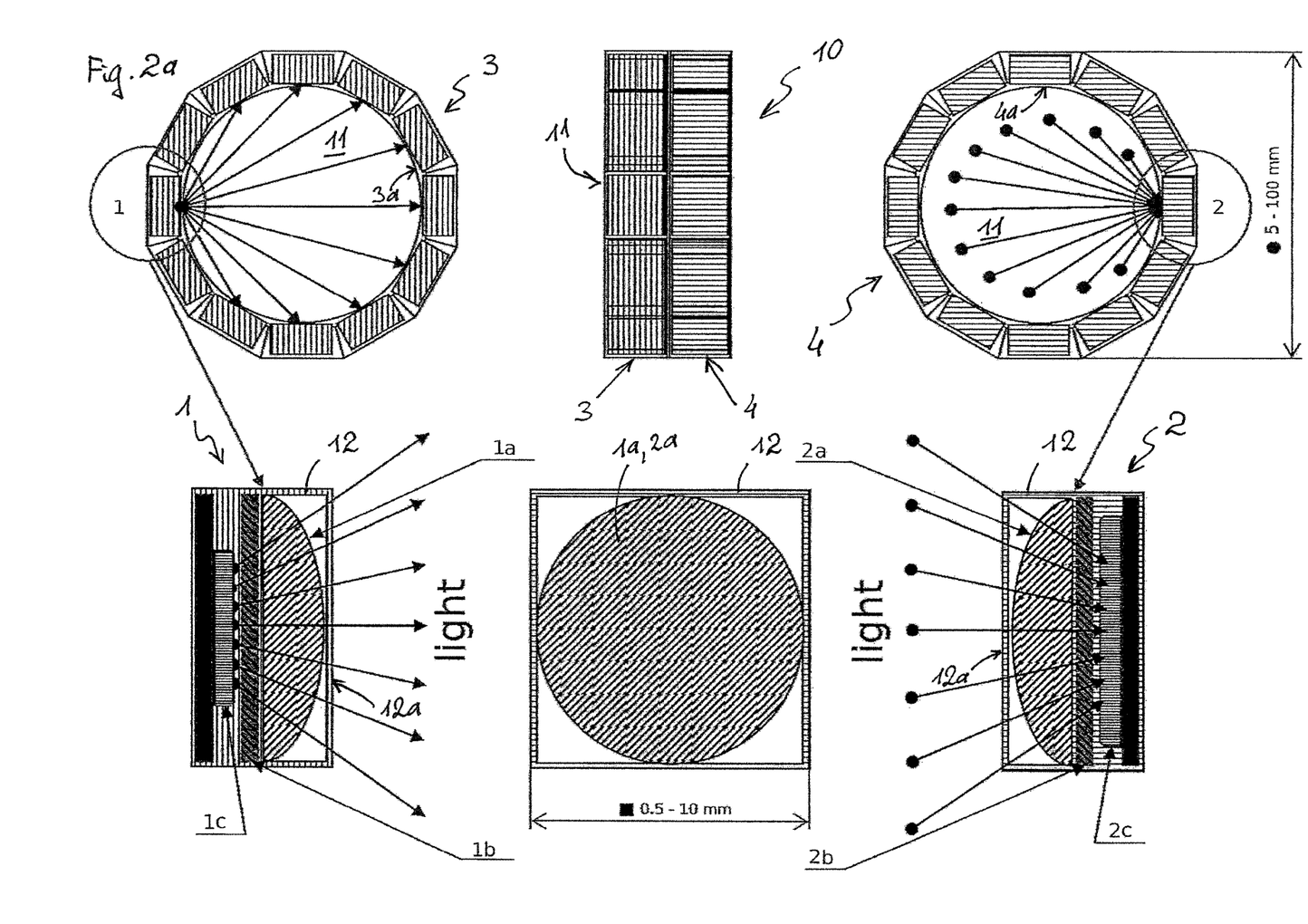
FIG. 2a shows the optical system of FIG. 1a during operation and respective enlarged side views of one of its light emitter modules and one of its light detector modules as well as a corresponding top view of an example of a respective optical concentrator.

FIG. 2a shows, in its upper half, light emitter assembly 3, light detector assembly 4, and optical system 10 of FIG. 1a during operation. This is also further visualized in an exploded perspective view shown in FIG. 2b. A more detailed example of the operation of optical system 10 is provided further below with reference to FIG. 2b and FIG. 3.

On the left in FIG. 2a, a central left light emitter module 1 (indicated by a circle) of light emitter assembly 3 is flashed. Thus, electromagnetic radiation in the bandwidth of the flashed light emitter module 1 is directed to the inside of the ring-shaped circumferences 3a/4a (the emitted and scattered light is visualized by arrows) and irradiates a medium under test (not shown) placed there, i.e. in an interspace 11 provided centrally between light emitter modules 1 and light detector modules 2 of optical system 10.

The response of the medium under test to this flashing due to, for instance, absorption, scattering, in particular Raman scattering, fluorescence, and/or phosphorescence can emanate from arbitrary points of the medium in the interspace 11 (as indicated by black points on the right in FIG. 2a). In particular, the fluorescence and the phosphorescence light is emitted isotropically and thus can reach all light detector modules 2 of light detector assembly 4.

On the right in FIG. 2a, by way of example, a central right light detector module 2 (also indicated by a circle) which is lying right opposite to the flashed light emitter module 1 in the neighboring light detector assembly 4 is shown to detect the medium response. Since the indicated light detector module 2 has the same central wavelength in this example, in particular, the absorption response of the medium under test can be captured thereby.

In the lower half of FIG. 2a, an enlarged side view of respectively one of the individual light emitter modules 1 and light detector modules 2 as well as a corresponding top view of an example of a respective optical concentrator 1a and 2a are shown in more detail. In this example, each light emitter module 1 comprises a light emitter 1c suitable for emitting light in a required wavelength range, an optical band-pass filter 1b suitable for defining a required specific bandwidth, and a suitable optical focusing element or concentrator 1a facing inward the ring-shaped circumference 3a of the light emitter assembly 3. Similarly in this example, each light detector module 2 comprises a light detector 2c suitable for detecting light in a required wavelength range, an optical band-pass filter 2b suitable for defining a required specific bandwidth, and a suitable optical focusing element or concentrator 2a facing inward the ring-shaped circumference 4a of the light detector assembly 4.

For instance, the center wavelengths of the individual light emitter modules 1 and light detector modules 2, i.e. the center wavelengths of the respective band-pass filters 1b and 2b, can increase gradually and circularly along the circumference 3a or, respectively, 4a by the value of the respective bandwidth of the band-pass filters 1b and 2b.

As shown in FIG. 2a, an outer diameter of light emitter assembly 3, light detector assembly 4, and/or optical system 10 may, for instance, lie in a range of approximately 5 to 100 mm within the scope of the present application not limited to the depicted examples, the choice of the size depending on the specific application demands. Similarly, an outer diameter of a light emitter module 1 and/or a light detector modules 2 may, for instance, lie in a range of approximately 0.5 to 10 mm within the scope of the present application not limited to the depicted examples.

As shown in FIG. 2a, light emitter modules 1 and/or light detector modules 2 may, for instance, be enclosed in a light-tight enclosure 12 or placed in a dark non-reflective environment. The enclosure or, respectively, environment can, for instance, be transparent for the light to be emitted or, respectively, detected on sides 12a of light emitter modules 1 and light detector modules 2 facing the medium or sample under test.

Figure 2B:
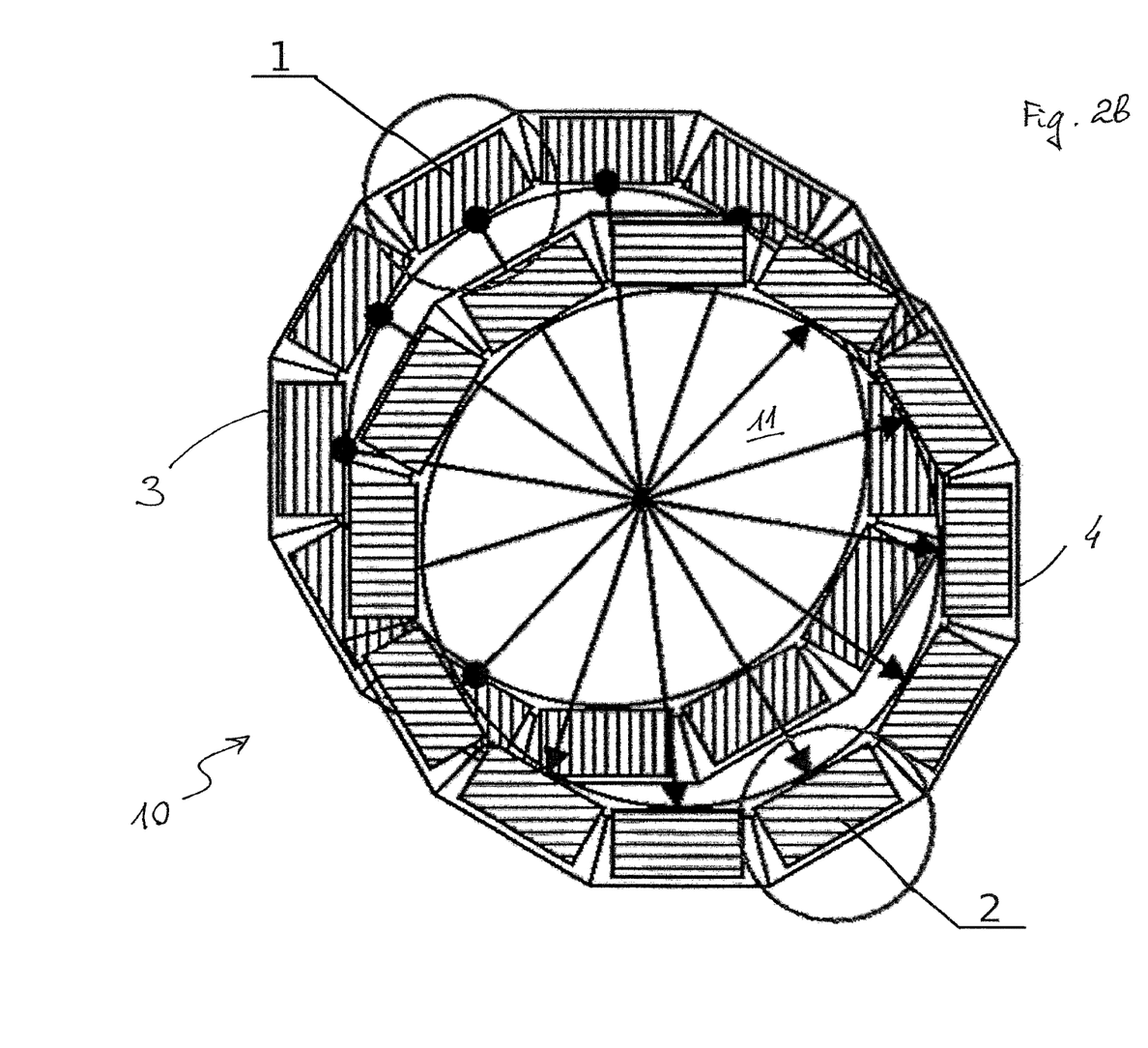
FIG. 2b shows an exploded perspective view of the optical system of FIG. 1a during operation.
Figure 3:
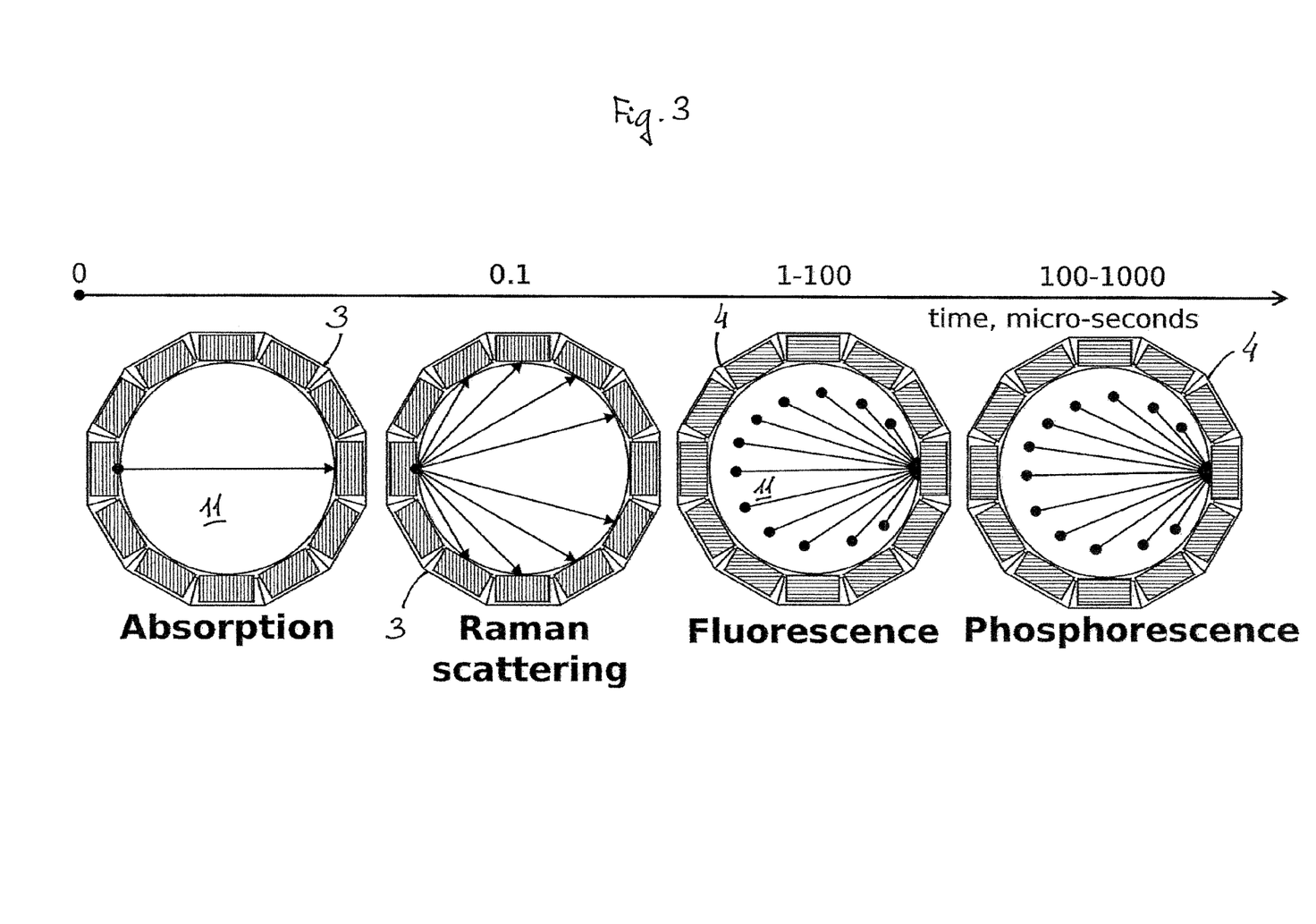
FIG. 3 shows an example of a possible time-scale of a readout sequence in a method of data acquisition using an optical system according to the invention which employs several different spectroscopic techniques including absorption, Raman scattering, fluorescence and/or phosphorescence.

With reference to FIGS. 2b and 3, an example of a possible operation of an optical system according to the invention and a method of data acquisition according to the invention using such an optical system and employing several different spectroscopic techniques including absorption, Raman scattering, fluorescence and/or phosphorescence will now be described. By way of example only, this will be done on the basis of optical system 10 of FIGS. 1-2a.

After all sensors of light detector modules 2 are powered and stabilized (e.g. dark count rate stabilized), data acquisition starts.

First, as shown in FIG. 2b, a first light emitter module 1 (indicated by a circle) having a predetermined center wavelength or, as the case may be in a larger system 10 as e.g. in FIG. 1b, a first group including all light emitter modules 1 having the same center wavelength, is flashed for a predetermined short duration. The latter may, for instance, reach from hundreds of picoseconds to hundreds of nanoseconds, as illustrated on a time-scale in FIG. 3.

As shown in the left half of FIG. 3, at the same time of flashing the first group of light emitter modules 1, a response of all the light detector modules 2 to flashing the first group of light emitter modules 1 is captured. Data collected during the flash contains, for instance, information about absorption properties of the medium under test as well as of Raman scattering. The absorption data can, in particular, be captured by light detector modules 2 (indicated by a circle in FIG. 2b) lying right opposite to the flashed light emitter modules 1 in the neighboring light detector assemblies 4 and having the same central wavelength. Raman scattered light will be measured by light detector modules 2 neighboring those with the same central wavelength as the flashed light emitter modules 1.

In other words, the method can comprise the steps of
flashing a light emitter module with a given central wavelength,
capturing absorption data with a light detector lying opposite the flashed light emitter module and having the same central wavelength, and capturing Raman light by light detectors neighbouring the one with the same central wavelength.

Subsequently, as shown in the right half of FIG. 3, a response of all light detector modules 2 to fluoresce and phosphorescence emission that follow the flash is captured. In particular, data collected right after the flash for a time period of e.g. 1 to 100 microseconds contains information about fluorescence emission from the medium. The fluorescence light is emitted isotropically and can thus be detected by all light detector modules 2, thus creating a fluorescence spectral response of the whole medium placed within the ring-shaped circumference 3a and 4a.

Further, data collected, for instance, after a few microseconds to a few milli-seconds after the flash, corresponds to phosphorescence emission from components of the medium under test. The phosphorescence light is emitted isotropically and can thus be detected by all light detector modules 2, thus creating a phosphorescence spectral response of the whole medium placed within the ring-shaped circumference 3a and 4a.

As shown in FIG. 2b, after the fluorescence and phosphorescence emission caused by flashing the first (group of) light emitter module(s) 1 has stopped, the previous steps are repeated for further central wavelengths of light emitter modules 1 of optical system 10, until all light emitter modules 1 of each light emitter assembly 3 are flashed on by one, from the lowest to the highest or from the highest to the lowest center wavelength in a resulting total bandwidth range of the system 10, or in any other order, and the respective response of the light detector modules 2 is captured.

While there are shown and described presently preferred embodiments of the invention, it is to be distinctly understood that the invention is not limited thereto but may be otherwise variously embodied and practiced within the scope of the following claims.

The invention claimed is:

1. An optical system for a spectral component analysis of non-solid media, the system comprising:
    one or more light emitter assemblies, each comprising a plurality of light emitter modules arranged in a curve along a ring-shaped circumference of that light emitter assembly, and
    one or more light detector assemblies, each comprising a plurality of light detector modules arranged in a curve along a ring-shaped circumference of that light detector assembly,
    wherein the one or more light emitter assemblies and the one or more light detector assemblies are coaxially arranged following one another along a common center axis in an alternating manner,
    wherein each light emitter module of at least one of the light emitter assemblies is configured for an individual specific bandwidth with a predetermined center wavelength,
    wherein each light detector module of at least one of the light detector assemblies is configured for an individual specific bandwidth with a predetermined center wavelength,
    wherein the light emitter modules and light detector modules configured for a specific bandwidth with the same center wavelength are arranged on opposite sides of the respective neighboring light emitter assemblies and light detector assemblies with respect to the center axis,
    wherein the light emitter assemblies are all substantially identical and/or the light detector assemblies are all substantially identical, and
    wherein the light emitter assemblies and the light detector assemblies are similar or substantially identical in size and shape.

2. The optical system of claim 1, wherein the ring-shaped circumference of at least one of the light emitter assemblies and/or of at least one of the light detector assemblies is substantially circular.

3. The optical system of claim 1:
    wherein the specific bandwidths of the individual light emitter modules at least minimally overlap, and/or
    wherein the specific bandwidths of the individual light detector modules at least minimally overlap.

4. The optical system of claim 1, wherein:
    the one or more light emitter assemblies and the one or more light detector assemblies are configured to continuously cover a total bandwidth range of electromagnetic radiation extending from UV to IR, and/or
    the one or more light emitter assemblies and the one or more light detector assemblies are configured to cover at least one or more different spectroscopic techniques selected from: absorption; scattering; Raman scattering; fluorescence; and/or phosphorescence.

5. The optical system of claim 1, wherein:
    the light emitter modules of a respective light emitter assembly are symmetrically arranged with respect to the center axis and/or equidistantly distributed around the center axis, and/or
    the light detector modules of a respective light detector assembly are symmetrically arranged with respect to the center axis and/or equidistantly distributed around the center axis.

6. The optical system of claim 1:
    wherein the light emitter modules of a respective light emitter assembly are substantially identical in size and shape, and/or
    wherein the light detector modules of a respective light detector assembly are substantially identical in size and shape.

7. The optical system of claim 1:
    wherein the total number of axially alternating light emitter assemblies and light detector assemblies is even.

8. The optical system of claim 1:
    wherein the axially alternating light emitter assemblies and light detector assemblies are adjacently stacked along the center axis at substantially equal distances from each other, and/or are directly adjacent to each other.

9. The optical system of claim 1:
    wherein the optical system is configured as a spectrometer for components analysis of a medium placed inside the ring-shaped circumference of the light emitter assemblies and the light detector assemblies,
    such that a non-solid medium under test can flow inside the optical system along the center axis in an interspace provided centrally between the light emitter modules and the light detector modules of the respective light emitter assemblies and light detector assemblies.

10. The optical system of claim 9, further including a readout chip for capturing a response of the light detector modules.

11. The optical system of claim 1 wherein each light emitter module comprises a light emitter and an optical band-pass filter.

12. The optical system of claim 1 wherein each light detector module comprises a light detector and an optical band-pass filter.

13. A method of data acquisition using the optical system of claim 1 employing a plurality of different spectroscopic techniques including absorption, Raman scattering, fluorescence and/or phosphorescence, covered by the total bandwidth ranges of the light emitter assemblies and the light detector assemblies, respectively, wherein:
    a first group including all light emitter modules having an identical center wavelength is flashed for a predetermined short duration;
    a response of all the light detector modules to flashing the first group of the light emitter modules is captured at the same time of the flash, so as to provide information about absorption and scattering;

a response of all the light detector modules to fluorescence and phosphorescence emission that follow the flash is captured; and after the fluorescence and phosphorescence emission caused by flashing the first group of light emitter modules has stopped, the previous steps are repeated for further central wavelengths of the light emitter modules, until all light emitter modules of each light emitter assembly are flashed one by one, from the lowest center wavelength to the highest center wavelength or from the highest center wavelength to the lowest center wavelength in a resulting total bandwidth range of the system, or in any other order, and the respective response of the light detector modules is captured.

14. The method of claim 13, wherein:

non-solid medium samples are subjected to the data acquisition at different times and/or with different concentration of components of a respective mixture, and using the acquired data, a time-series and/or pattern analysis is performed.

15. The method of claim 13 further comprising:

flashing a light emitter module with a given central wavelength, capturing absorption data with a light detector lying opposite the flashed light emitter module and having the same central wavelength, and capturing Raman light by light detectors neighbouring the one with the same central wavelength.

16. The method of claim 15 comprising the subsequent step of capturing a response of all light detector modules to fluorescence and phosphorescence emission that follow the flash.

17. An optical system for a spectral component analysis of non-solid media, the system comprising:

one or more light emitter assemblies, each comprising a plurality of light emitter modules arranged in a curve along a ring-shaped circumference of that light emitter assembly; and one or more light detector assemblies, each comprising a plurality of light detector modules arranged in a curve along a ring-shaped circumference of that light detector assembly;

wherein the one or more light emitter assemblies and the one or more light detector assemblies are coaxially arranged following one another along a common center axis in an alternating manner;

wherein each light emitter module of at least one of the light emitter assemblies is configured for an individual specific bandwidth with a predetermined center wavelength;

wherein each light detector module of at least one of the light detector assemblies is configured for an individual specific bandwidth with a predetermined center wavelength;

wherein the light emitter modules and light detector modules configured for a specific bandwidth with the same center wavelength are arranged on opposite sides of the respective neighboring light emitter assemblies and light detector assemblies with respect to the center axis; and wherein said center wavelengths increase gradually and circularly along a circumference of said light emitter and/or light detector assemblies.

18. A method of data acquisition for spectral component analysis of non-solid media using an optical system, wherein the optical system comprises:

one or more light emitter assemblies each comprising a plurality of light emitter modules; and one or more light detector assemblies each comprising a plurality of light detector modules;

wherein each light emitter module of at least one of the light emitter assemblies is configured for an individual specific bandwidth with a predetermined center wavelength;

wherein each light detector module of at least one of the light detector assemblies is configured for an individual specific bandwidth with a predetermined center wavelength;

wherein the light emitter modules and the light detector modules configured for a specific bandwidth with the same center wavelength are arranged on opposite sides of the respective neighboring light emitter assemblies and light detector assemblies with respect to the center axis; and the method comprises employing a plurality of different spectroscopic techniques including two or more of absorption, Raman scattering, fluorescence, and phosphorescence, and wherein the method further comprises:

a) flashing a first group that includes all light emitter modules having an identical center wavelength for a predetermined duration;

b) capturing a response of all of the light detector modules to flashing the first group of the light emitter modules at the same time of the flash, so as to provide information about absorption and scattering;

c) capturing a response of all of the light detector modules to fluorescence and phosphorescence emission that follow the flash; and d) repeating, after the fluorescence and phosphorescence emission caused by flashing the first group of light emitter modules has stopped, steps a), b), and c) for further central wavelengths of the light emitter modules, until all of the light emitter modules of each light emitter assembly are flashed one by one.

19. The method of claim 18 further comprising:

flashing a light emitter module with a given central wavelength;

capturing absorption data with a light detector lying opposite the flashed light emitter module and having the same central wavelength, and capturing Raman light by light detectors neighbouring the one with the same central wavelength.

20. The method of claim 19 further comprising the subsequent step of capturing a response of all of the light detector modules to fluorescence and phosphorescence emission that follow the flash.

* * * * *